United States Patent
Jakob et al.

(10) Patent No.: US 7,661,498 B2
(45) Date of Patent: Feb. 16, 2010

(54) FLUID CUSHION CONVEYANCE SYSTEM

(75) Inventors: Ueli Jakob, Busswil b.B. (CH); Daniel Schauble, Hasle-Ruegsau (CH); Markus Abbuhl, Oberwil (CH)

(73) Assignee: Soletanche Freyssinet, Rueil Malmaison (FR)

( * ) Notice: Subject to any disclaimer, the term of this patent is extended or adjusted under 35 U.S.C. 154(b) by 453 days.

(21) Appl. No.: 11/798,162

(22) Filed: May 10, 2007

(65) Prior Publication Data

US 2008/0000705 A1  Jan. 3, 2008

(30) Foreign Application Priority Data

May 10, 2006  (EP)  .................................. 06290745

(51) Int. Cl.
   *B60V 1/00* (2006.01)
(52) U.S. Cl. ....................................... 180/125; 180/124
(58) Field of Classification Search .................. 180/116, 180/117, 118, 119, 120, 121, 122, 123, 124, 180/125, 126, 127, 128, 129, 130
   See application file for complete search history.

(56) References Cited

U.S. PATENT DOCUMENTS

| 3,082,836 | A | * | 3/1963 | Biliman | ....................... 180/124 |
| 3,768,588 | A |   | 10/1973 | Vaughen | |
| 4,172,506 | A |   | 10/1979 | Terry | |
| 4,538,699 | A |   | 9/1985 | Kutscher et al. | |
| 4,753,311 | A | * | 6/1988 | Berger et al. | ................. 180/125 |
| 4,951,770 | A | * | 8/1990 | Vaughen | ..................... 180/124 |

FOREIGN PATENT DOCUMENTS

| DE | 41 12 107 A1 | 11/1991 |
| GB | 1 377 807 | 12/1974 |
| JP | 04-243715 | 8/1992 |

* cited by examiner

*Primary Examiner*—Lesley Morris
*Assistant Examiner*—Marc A Scharich
(74) *Attorney, Agent, or Firm*—McKenna Long & Aldridge LLP

(57) ABSTRACT

A fluid-cushion supporting arrangement for horizontal conveyance comprises a supporting platform having a center and a distal portion; a flexible angular sealing element arranged under the platform in the region of the distal portion and forming a sealing piston. The sealing piston has a substantially horizontal leg which extends toward the center and forms together with the supporting platform a fluid chamber, and a substantially vertical leg which forms together with the supporting platform a control pressure chamber. The vertical leg is vertically and adjustably inserted in the control pressure chamber. An inlet valve is provided for supplying fluid into the fluid chamber. A pressure-regulating arrangement in fluid communication with the fluid chamber and the control pressure chamber regulates the fluid pressure. The vertical leg comprises a plurality of reinforcement elements including at least one metallic strip.

9 Claims, 3 Drawing Sheets

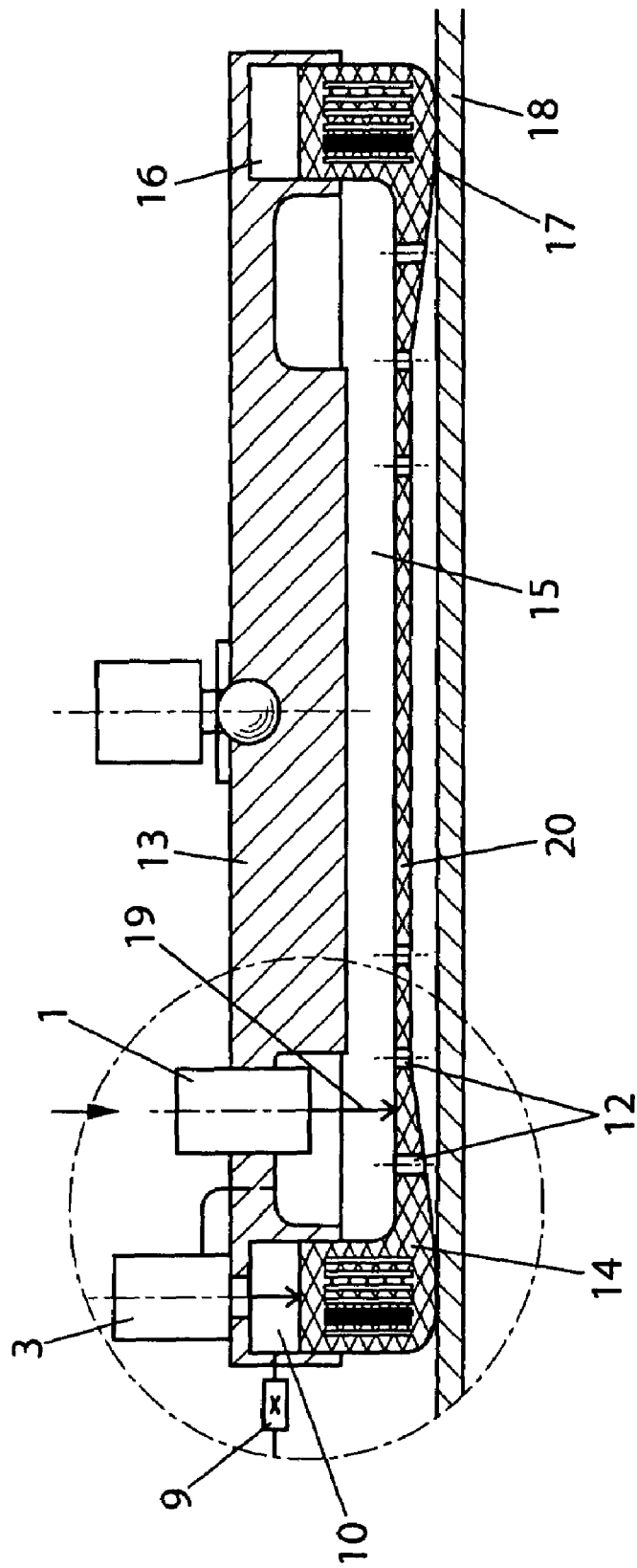
FIG. 1.1

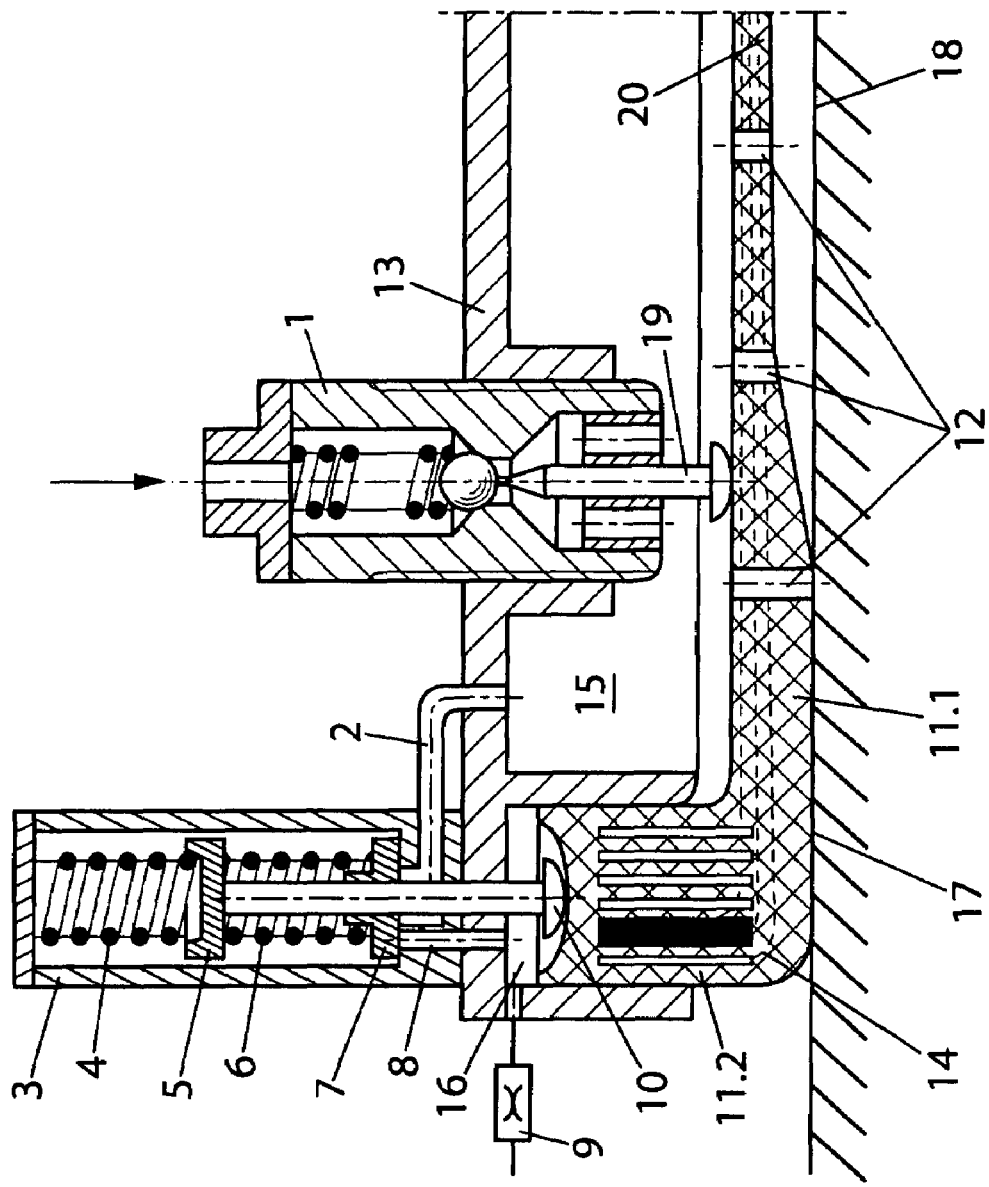
FIG. 1.2

FLUID CUSHION CONVEYANCE SYSTEM

This application claims the benefit of European Patent Application No. 06290745.6 filed on May 10, 2006, which is hereby incorporated by reference for all purposes as if fully set forth herein.

BACKGROUND OF THE INVENTION

The present invention relates to a fluid-cushion supporting arrangement for horizontal conveyance. More particularly, it relates to a fluid-cushion supporting arrangement for horizontal conveyance with high fluid pressure and control technological stabilization, suitable for assembly conveyance of heavy loads and respectively high slender bodies on slide tracks.

Horizontal conveyance of loads with the aid of conveying means supported by fluid cushions is known in the art. The principal advantage of this conveyance is a low friction between a base surface and a conveying means, which makes possible easy displacement of the latter. The distance between the base surface and the fluid-cushion supporting arrangement must be minimal, e.g. less than 1 mm. This condition is satisfied with completely plane slide tracks adjusted with high accuracy. The known fluid-cushion supporting arrangements have, however, considerable leakage losses of the fluid medium and thereby high energy losses and environmental loads. These disadvantages are reduced by sealing pistons or inflatable sealing elements composed of an elastic material and arranged in the marginal zone of the fluid pressure chamber.

Such sealing pistons are known from U.S. Pat. No. 4,538,699. The described fluid-cushion supporting arrangement comprises: a supporting platform having a center and a distal portion; a flexible angular sealing element arranged under said platform in the region of said distal portion and forming a sealing piston, said sealing piston having a substantially horizontal leg which extends toward said center and forms together with said supporting platform a fluid chamber, and a substantially vertical leg which forms together with said supporting platform a control pressure chamber, said vertical leg being vertically and adjustably inserted in the latter; inlet means for supplying a fluid into said fluid chamber; and a pressure-regulating arrangement in fluid communication with said fluid chamber and said control pressure chamber for regulating the fluid pressure.

Such a supporting arrangement nevertheless may only convey a limited load. When trying to convey heavy loads, like for example 300 tons or heavier, the control pressure chamber may leak due to significant deformation of the sealing ring, specifically of its vertical leg.

Therefore there is a need for an improved supporting arrangement that allows conveying significantly heavier loads without leaking from the control pressure chamber and damage to the sealing ring. There is also a need for a fluid-cushion supporting arrangement which is suitable for utilization at construction sites for horizontal conveyance of heavy loads and/or high slender bodies while being less energy-consuming and having reduced fluid losses and lower environmental loads, as compared with known arrangements.

SUMMARY OF THE INVENTION

An embodiment of the invention relates to a fluid-cushion supporting arrangement for horizontal conveyance, comprising:

a supporting platform having a center and a distal portion;

a flexible angular sealing element arranged under said platform in the region of said distal portion and forming a sealing piston, said sealing piston having a substantially horizontal leg which extends toward said center and forms together with said supporting platform a fluid chamber, and a substantially vertical leg vertically and adjustably inserted in the supporting platform to form a control pressure chamber, said vertical leg comprising a plurality of reinforcement elements including at least one metallic strip;

inlet means for supplying a fluid into said fluid chamber; and a pressure-regulating arrangement in fluid communication with said fluid chamber and said control pressure chamber for regulating the fluid pressure.

The reinforcement elements located in the vertical leg are useful to maintain its integrity and initial form to keep the control pressure chamber leak-tight.

BRIEF DESCRIPTION OF THE DRAWINGS

FIG. 1.1 is a view showing a vertical section of an example of fluid-cushion supporting arrangement;

FIG. 1.2 is a detailed view of the distal end of the fluid-cushion supporting arrangement of FIG. 1.1; and, FIG. 2 is a view showing a vertical cross section of the sealing ring.

DETAILED DESCRIPTION OF EMBODIMENTS

Figure 2:
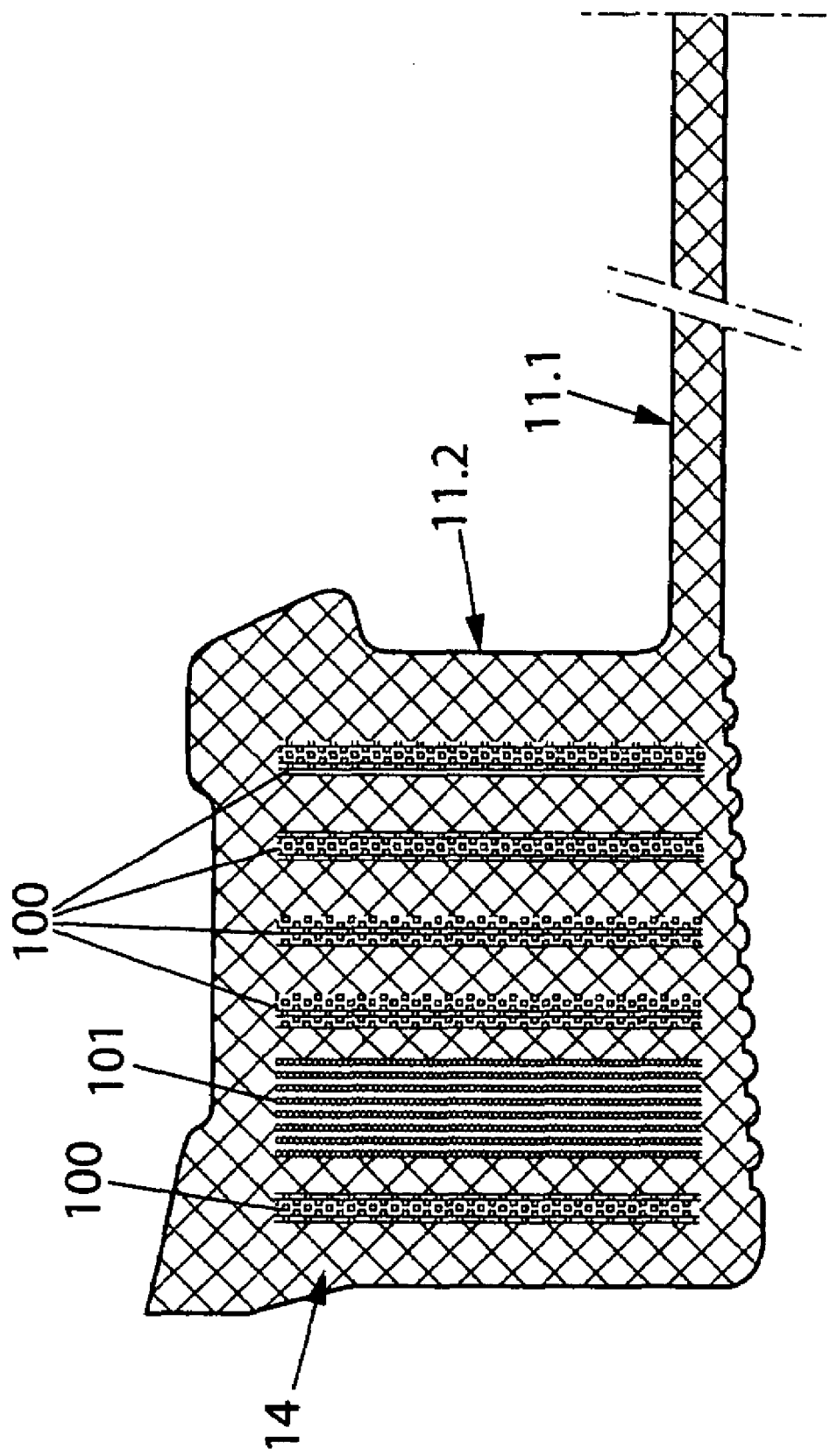

A fluid-cushion supporting arrangement for horizontal conveyance is shown in FIGS. 1.1 and 1.2. It has a supporting platform which is identified with reference numeral 13. A flexible angular element 14 is located under the supporting plate 13 in the region of its marginal portion and is formed as a sealing piston. The supporting platform 13 is preferably designed in a circular manner whereas the sealing piston 14 is preferably designed in an annular manner. The supporting platform 13 and the sealing piston 14 together form respectively a fluid chamber 15 in the center region of the platform and a control pressure chamber 16 in the distal portion of the platform 13.

A pressure regulating device 3 is arranged in the end region of the supporting plate 13, and an inlet valve 1 is provided in the supporting platform 13 and particularly in its region which is closer to the center. The pressure regulating device 3 has a sensor 10 which extends into the control pressure chamber 16 and is in contact with the sealing piston 14. The inlet valve 1 is provided with a sensor 19 which extends into the fluid chamber 15 and is also in contact with the sealing piston 14.

As can be seen from FIG. 1.1, the sealing piston 14 includes a substantially horizontal leg 11.1 and a substantially vertical leg 11.2. The substantially horizontal leg 11.1 limits from below the fluid chamber 15, whereas the substantially vertical leg 11.2 limits from below the control pressure chamber 16. The sensor 10 of the pressure-regulating device 3 is in contact with the vertical leg 11.2 of the sealing piston 14, and the sensor 19 of the inlet valve 1 is in contact with the horizontal leg 11.1 of the sealing piston. As seen in FIGS. 1.1 and 1.2, the vertical leg 11.2 is vertically and adjustably inserted in the control pressure chamber 16.

To avoid inadmissible expansion of the flexible sealing piston 14, the sealing piston which is formed as a ring-shaped body may be stiffened at its bottom side. i.e. along its horizontal leg 11.1 by a textile-reinforced bottom plate 20. The bottom plate 20 is provided with openings 12 which permit exit of the fluid to a slide track 18 or a sealing gap 17.

In the fluid-cushion supporting arrangement considered here, the sealing piston 14 is further reinforced thanks to a plurality of reinforcement elements 100 and 101 as seen in FIG. 2 and provided in its vertical leg 11.2. Such elements allow the vertical leg 11.2 received in the control pressure chamber 16 to maintain its outer form and ensure a leak-tight chamber 16. Heavy loads may thus be conveyed with the supporting arrangement.

In an embodiment of the supporting arrangement, the reinforcement elements are reinforcement strips. They may also be parallel with each others. Such a layout of the strips ensures the integrity of the vertical leg 11.2 in a preferred direction. In an additional embodiment of the supporting arrangement, the reinforcement strips extend vertically. Thus, the strips extend in the same direction than the vertical leg 11.2 and its insertion direction. With an increased integrity in the insertion direction, leak-tightness of chamber 16 is significantly improved.

When the sealing piston 14 is designed in an annular manner as mentioned earlier, i.e. its vertical leg 11.2 forms a ring, its center may be located vertically from the supporting platform 13 center, as seen in FIG. 1.1. In this configuration, the reinforcement strips 100 and 101 are preferably concentric circular strips centered on the center of said ring. In other words, the strips form a series of loops extending circumferentially around the sealing piston center, the width of said strips extending in the vertical direction as seen in FIG. 2.

In a preferred embodiment, the reinforcement strips comprise at least one textile based strip. In another preferred embodiment, the reinforcement strips comprise at least one metallic strip. The reinforcement strips may advantageously be a combination of textile based strips and at least one metallic strip.

FIG. 2 shows a preferred arrangement of reinforcement strips, based on test results to optimize the strip configuration. In this example, the second most distal reinforcement strip in the vertical leg of the sealing piston, as seen in the radial direction from the center of the sealing piston 14, is a metallic strip.

Although various types of metallic strip, including alloy based strips may be used, the metallic strip is preferably a steel based strip.

The steel based strip(s) may comprise steel cords. Steel cord reinforcement is an efficient way to give added strength and durability to sealing piston 14. Such strips may offer a combination of high strength, high modulus and the absence of creep. This can be reached through intertwined or braided strands made of a given number of steel filaments. A filament diameter may vary e.g. between 30 to 200 □m. The coating of filaments may be Zinc or Brass based. Stainless steel filaments may also be used. Examples of steel cords are 7×3, i.e. 7 strands each made of 3 stainless steel filaments, or 7×7. The resulting cord diameter range is 0.1 up to 2 mm, or more if necessary. The here above teachings may be applied to metallic strips comprising metallic cords.

The sealing piston 14 is preferably rubber based and overmolded on the plurality of reinforcement strips placed next to each others. In order to manufacture the sealing piston 14 as seen in FIG. 2, the concentric strips are arranged next to each others and centered on a point that is to be the center of the sealing piston. Rubber is then overmolded on the strips so as to obtain the form of the sealing piston 14 with a horizontal leg 11.1 and a vertical leg 11.2. Each strip is separated with rubber that comes in between during the overmolding process. The overmolding stage may be achieved using techniques similar to the techniques used in tire manufacturing.

The fluid cushion supporting arrangement works as follows. The pressure relation between the fluid chamber 15 and the control pressure chamber 16 is carried out with the aid of the pressure-regulating device 3. The pressure-regulating device 3 is connected by a passage 2 with the fluid chamber 15 and by a passage 8 to the control pressure chamber 16. The pressure-regulating device 3 has a valve plate 7 provided with a valve spring 6 and slidable on a shaft of the sensor 10. It also has a spring plate 5 provided with a helical compression spring 4.

A fluid flow generated by a pump or a compressor travels via the inlet valve 1 into the fluid chamber 15 which is filled with the fluid medium. When the pressure develops, the fluid medium flows via the passage 2 toward the valve plate 7 of the pressure-regulating device 3. In a pause the sealing piston 14 is fully positioned inside the piston guide limited by the supporting platform 13. More particularly, the leg 11.2 of the sealing piston 14 is fully inserted in the control pressure chamber 16. The sensor 10 of the pressure-regulating device 3, which is loaded by the upper spring 4, is pressed upwardly and releases by the spring plate 5 the lower valve spring 6. The valve plate 7 which is freely slidable on the shaft of the sensor 10 allows in this position free fluid flow to the passage 8 and therefore into the control pressure chamber 16. In the pause the pressure in the fluid chamber 15 corresponds to the pressure above the leg 11.2 of the sealing piston 14 in the control pressure chamber 16.

The sealing action in the sealing gap 17 is complete. With increasing generation of pressure, lifting of the supporting platform 13 with the respective load takes place. With increase of the hovering height, the sensor 10 of the pressure-regulating device follows the downwardly pressed leg 11.2 of the sealing piston 14 and moves downwardly so that the spring plate 5 presses the valve spring 6 continuously against the valve plate 7. The pressure in the control pressure chamber 16 applied via the passage 8 thereby decreases. The height-dependent pressure reduction in the control pressure chamber 16 is stabilized with the aid of a relief throttle 9. When the predetermined hovering height is reached, the supporting platform 13 closes the inlet valve 1. In this conveyance position the pressure relief on the sealing piston 14 in the sealing gap 17 leads to the beginning of fluid passage from the fluid chamber 15 outwardly through the openings 12. In relation to the admissible friction during conveyance between the sealing piston and the slide track 18 to the fluid loss, there is a reciprocal adjustment of the inlet valve 1 to the pressure-regulating device 3.

Another possibility of the reciprocal adjustment of the inlet valve 1 to the pressure-regulating device 3 is provided by a changeable prestress of the pressure spring 4 and the valve spring 6 of the pressure-regulating device 3 from outside. A foreign supply of the control medium is dispensed within the inventive arrangement, inasmuch as the pressure in the fluid chamber 15 is always equal to or higher than the pressure in the control pressure chamber 16 above the sealing piston 14.

What is claimed is:

1. A fluid-cushion supporting arrangement for horizontal conveyance, comprising:
   a supporting platform having a center and a distal portion;
   a flexible angular sealing element arranged under said platform in the region of said distal portion and forming a sealing piston, said sealing piston having a substantially horizontal leg which extends toward said center and forms together with said supporting platform a fluid chamber, and a substantially vertical leg vertically and adjustably inserted in the supporting platform to form a control pressure chamber, said vertical leg comprising a plurality of reinforcement elements including at least one metallic strip;

inlet means for supplying a fluid into said fluid chamber; and a pressure-regulating arrangement in fluid communication with said fluid chamber and said control pressure chamber for regulating the fluid pressure.

2. A supporting arrangement according to claim 1, wherein the reinforcement elements extend vertically.

3. A supporting arrangement according to claim 1, wherein the vertical leg of the sealing piston forms a ring with a center disposed vertically from the center of the supporting platform, and wherein the plurality of reinforcement elements include reinforcement strips comprising concentric circular strips centered on said center of said ring.

4. A supporting arrangement according to claim 1, wherein the reinforcement elements comprise textile-based strips.

5. A supporting arrangement according to claim 1, wherein the metallic strip comprises a plurality of steel filaments grouped in strands to form a steel cord.

6. A supporting arrangement according to claim 1, wherein the plurality of reinforcement elements comprises a combination of textile-based strips and at least one metallic strip.

7. A supporting arrangement according to claim 1, wherein the plurality of reinforcement elements include a most distal reinforcement strip in the vertical leg of the sealing piston, said most distal reinforcement strip being a textile-based strip.

8. A supporting arrangement according to claim 7, wherein the plurality of reinforcement elements include a second most distal reinforcement strip in the vertical leg of the sealing piston, said second most distal reinforcement strip being a metallic strip.

9. A supporting arrangement according to claim 1, wherein the sealing piston is formed with rubber overmolded on the plurality of reinforcement elements.

* * * * *